May 5, 1936.  C. H. HOWLAND-SHEARMAN  2,039,846
CLUTCH
Filed July 27, 1934  3 Sheets-Sheet 1

INVENTOR
Charles H. Howland-Shearman
BY
ATTORNEY

May 5, 1936.  C. H. HOWLAND-SHEARMAN  2,039,846
CLUTCH
Filed July 27, 1934   3 Sheets-Sheet 2

INVENTOR
Charles H. Howland-Shearman
BY
ATTORNEY

May 5, 1936.  C. H. HOWLAND-SHEARMAN  2,039,846
CLUTCH
Filed July 27, 1934    3 Sheets-Sheet 3
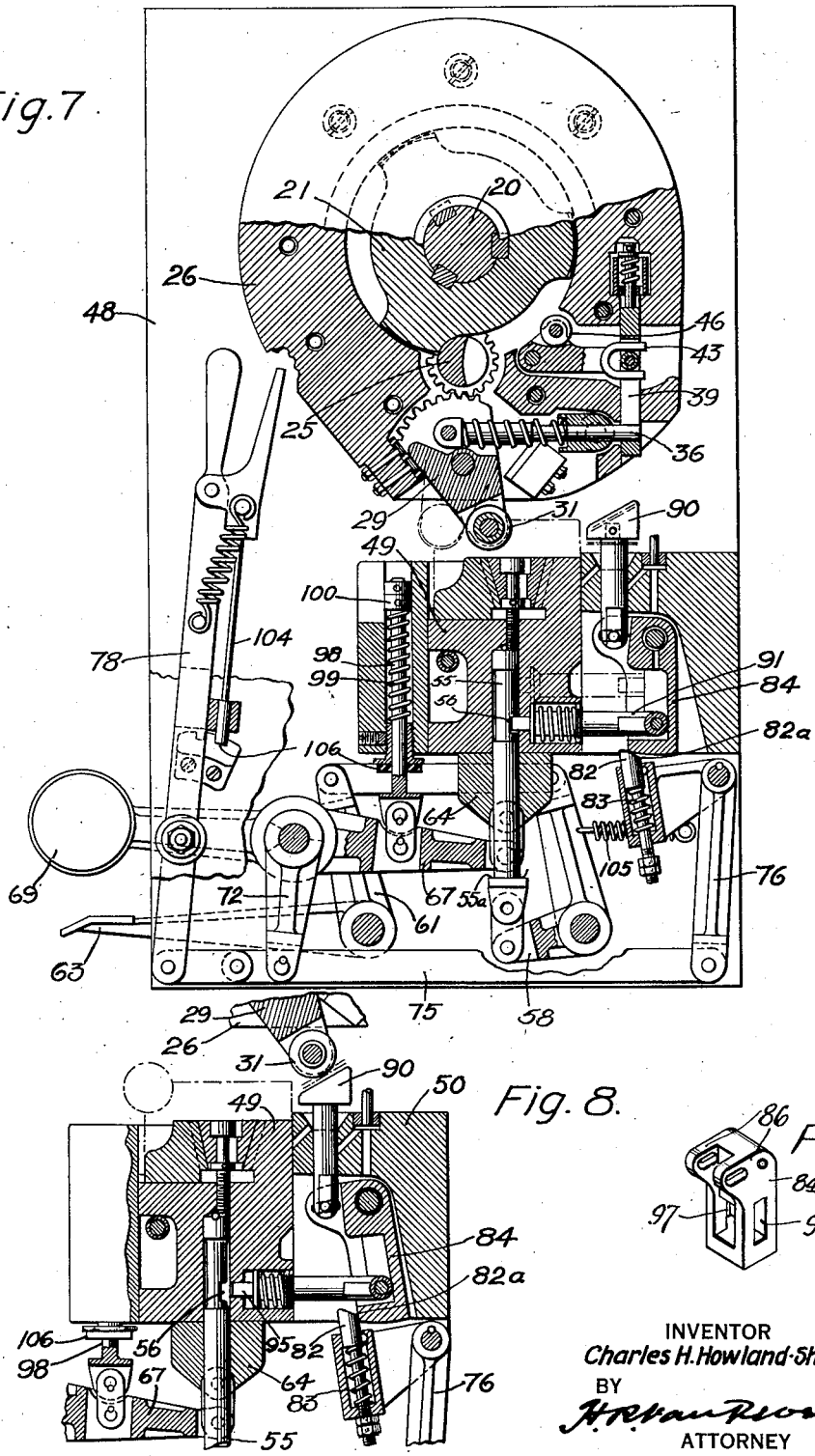
INVENTOR
Charles H. Howland-Shearman
BY
ATTORNEY Patented May 5, 1936

2,039,846

UNITED STATES PATENT OFFICE 2,039,846

CLUTCH

Charles H. Howland-Shearman, Hamden, Conn.

Application July 27, 1934, Serial No. 737,155

12 Claims. (Cl. 192—29)

This invention relates to improvements in clutches, and more particularly to automatic safety clutches having a clutching member and a clutched member and automatic mechanism controlled by the clutching member and adapted to make automatic selection of the time and angular position of clutching and unclutching of said members.

The invention consists substantially in the construction, combination, location and relative arrangement of parts, all as will be more fully hereinafter set forth, as shown by the accompanying drawings, and finally pointed out in the appended claims.

Objects of the invention are:

To provide an auto-selective clutch of absolutely safe engaging and disengaging functions;

To provide in an auto-selective safety clutch, a renewable clutching member, a renewable clutched member and automatic mechanism adapted to make auto-selection of the time and angular position of clutching and unclutching the clutched member;

To provide a safety clutch having an auxiliary mechanism which shall be capable of accelerating the clutched member so that its angular velocity shall greatly exceed that of the clutching member and thus render impossible the serious accidents which often result from the misengagement of clutches;

To provide in a safety clutch, members which shall be adapted to render the entire clutching and releasing operations of the mechanism substantially shockless and noiseless at all times, thus greatly contributing to the durability of the mechanism.

Other objects of the invention will be apparent from the following specification, in which, by way of illustration, is shown an automatic safety clutch adapted for use with the machine disclosed in the pending application, Serial No. 702,286, filed December 14, 1933.

The said application shows a machine for causing cold flow in various substances such as metals and is operated by a power shaft. The clutch, the subject matter of the instant application, would be connected between this shaft and the prime mover.

In the accompanying drawings:

Figure 7 is a side view of the mechanism set for full automatic operation;

Figure 8 is a detail view showing the trip-shoe lock-out latch in latched position; and Figure 9 is a perspective detail view of the bell-crank yoke.

Figures 1, 2, 3, 4:
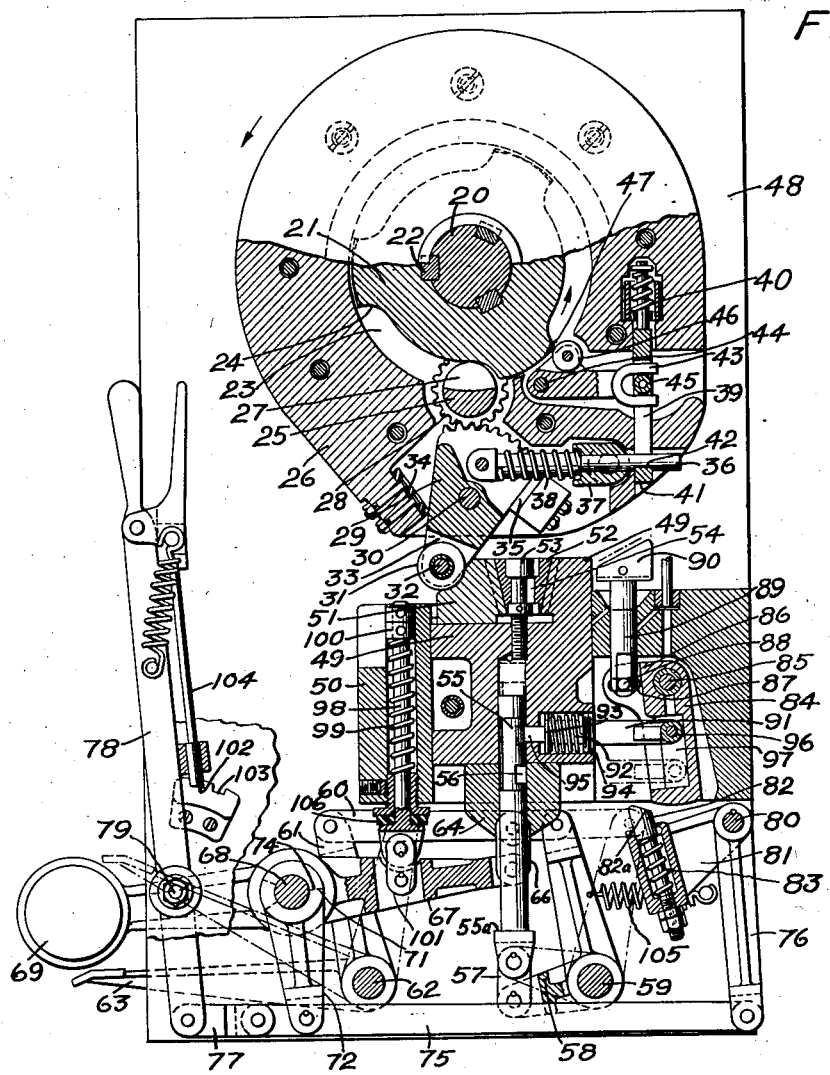
Figure 1 is a cross sectional view of the clutch in declutched position, the control being set for semi-automatic operation.
Figure 2 is a detail view of the horizontal counter-balanced lever, Figure 1.
Figure 3 is a rear view of the swinging link, Figure 1.
Figure 4 is a left side elevation of the same.

Referring to Figure 1, the numeral 20 denotes a power shaft on which a clutching member 21 is fastened by means of keys 22. The periphery of member 21 is formed with a series of recesses 23 having rounded ends 24. The numeral 25 denotes a rotatable member journalled in a body or housing 26 and adapted to engage the rounded ends 24 of recesses 23. A portion 27 of member 25 is cut away, and a pinion 28 is formed on or secured to member 25.

A segmentally geared oscillator 29, in mesh with pinion 28 is adapted to oscillate on a pin 30 secured in the body 26. A roller 31 is rotatable on a pin 32 in a downward extension 33 of oscillator 29. Pads 34 and 35 of rawhide or other suitable material, secured to body 26, serve to limit the movement of oscillator member 29.

A rod 36 pivoted to the oscillator 29 and slidable in a trunnion 37 supported in body 26, is urged to the left by a compression spring 38, hereinafter referred to as the accelerator spring.

A locking yoke 39, slidable in body 26 and urged upward by a compression spring 40, has a lower cross bar 41 adapted to engage a notch 42 in the rod 36.

The numeral 43 denotes a forked timer lever pivoted to body 26 at 44 and spanning a roller 45 in locking yoke 39. Lever 43 carries a trip roller 46 adapted to engage bevels 47 on the outer surfaces of driving member 21.

Figures 5, 6:
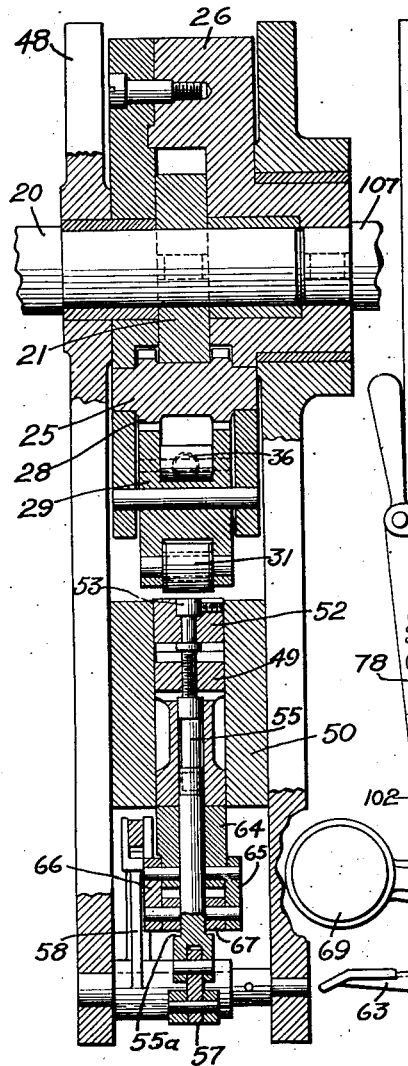
Figure 5 is a view similar to Figure 1, but with the clutch engaged.
Figure 6 is a vertical section of the same on the line 6—6, Figure 5.

The numeral 48 denotes a suitable frame or support in which the shaft 20 is journalled as shown in Figure 6.

A release plunger 49, slidable vertically in a stationary guide 50 carries a concave contact block 51. A wedge 52 dovetailed to the release plunger 49 and block 51 and adjustable vertically by means of a screw 53 in a slot 54, provides a means of adjusting the contact block 51 horizontally. A plunger 55, having a lateral rectangular notch 56 and lower shoulders 55a, is slidable vertically in the release plunger 49 and is connected by a link 57 to a bell crank 58 pivoted at 59 to the frame 48. A horizontal link 60 connects bell crank 58 with a second bell crank 61 pivoted to the frame at 62 and terminating in a pedal 63.

A block 64, slidable on plunger 55, is articulated by means of links 65 and 66, Figure 6, with a horizontal lever 67 rockable on a stationary pin 68 and provided with a counterweight 69. A segmental extension 70 having a shoulder 71, is provided on the lever 67 as shown in Figure 2. A swinging link 72, mounted on pin 68 in front of the lever 67 is also formed with a segmental extension 73, Figures 3 and 4, having a shoulder 74 adapted to engage shoulder 71.

The swinging link 72 is pivoted to a horizontal link 75 articulated at the right end to an arm 76 and at the left end through a short link 77 to a manual positioning lever 78 pivoted to the frame 48 at 79. The arm 76 is fastened in any suitable manner to a shaft 80 journalled in the frame 48. A latch lever 81 is also fastened to the shaft 80 and contains a sliding latch 82 urged upward by a compression spring 83. The latch 82 has an inclined or cam-shaped upper end 82a.

The numeral 84 denotes a bell crank yoke, shown in detail in Figure 9, pivoted on a stationary pin 85. The horizontal portion 86 of the yoke 84 contains a slot 87, engaging a cross pin 88 in the lower end of a vertically slidable rod 89. The numeral 90 denotes an inclined timer shoe fastened to the upper end of rod 89.

A tripper latch 91 is slidable in the release plunger 49 and is urged to the left by a compression spring 92 disposed between a flange 93 and a short bushing 94. The numeral 95 denotes a nose of latch 91 adapted to engage the notch 56 in release plunger 55. The latch 91 carries a pair of rollers 96 engaging vertical slots 97 in the sides of yoke 84.

A vertical rod 98 slidably mounted in the stationary guide 50 and urged upward by a compression spring 99 bearing against a collar 100, is articulated by a short link 101 to the horizontal lever 67.

The numerals 102 and 103 denote left and right positioning notches adapted to be engaged by a manually operable detent 104 on the positioning lever 78.

A tension spring 105 urges the bell crank lever 58 in a clock-wise direction. The numeral 106 denotes a stop pad surrounding the vertical rod 98. The body or housing 26 is secured to a driven shaft 107, Figure 6.

The operation of the device is as follows: Referring to Figure 1, which shows the apparatus positioned by lever 78 for semi-automatic operation, the release plunger 49 is held up by the spring 99 which has raised block 64 by rocking the lever 67 counter-clockwise. In this position the roller 31 is held by the contact block 51. During the previous declutching the counter-clockwise revolution of the body or housing 26 after bringing roller 31 into contact with 51 has swung the oscillator 29 clockwise, thus compressing the accelerator spring 38 and allowing the cross bar 41 of locking yoke 39 to be snapped into the notch 42, by spring 40. The oscillator 29 is thereby locked in the position shown in Figure 1, the accelerator spring 38 remaining compressed. The described clockwise oscillation of 29 revolves the member 25 to the position shown, releasing the clutching member 21 which now idles through the cut-away portion 27.

The apparatus being set by the positioning lever 78 for semi-automatic operation as noted above, the operator is assumed to have his foot on the pedal 63, holding the latter down. When it is desired to engage the clutch, the operator first raises his foot, allowing the tension spring 105 to swing the bell crank 58 clockwise, raising the plunger 55 until the nose 95 of the latch 91 snaps into the notch 56.

The pedal 63 is now depressed, drawing down the plunger 55 which carries with it the release plunger 49 and frees the roller 31. The oscillator 29 being locked by the yoke 39 as previously described, the clutch cannot engage until one of the bevel corners 47 of the clutching member 21 strikes and depresses the roller 46. When this occurs the trip lever 43 is depressed, moving the yoke 39 downward and releasing the cross bar 41 from the notch 42 in rod 36. The spring 38 expands, accelerating the oscillator 29 in a counter-clockwise oscillation which rotates the member 25 clockwise through an angle of 90°. The engaging portion of 25 is thus presented to the next approaching rounded end of the depression 23, which engages 25 as shown in Figure 5, thus engaging the clutch and causing the body 26 to be driven counter-clockwise.

It is evident that the member 25 is subject to greatest wear. By reference to Figure 6 it will be seen that the part 25 may readily be removed for replacement by removing the side plate from the clutch body 26. However, since wear occurs principally on one side of the member 25, the member may be removed, turned end for end in a vertical plane, and replaced, thus bringing the substantially unworn side into wearing position. By this means the useful life of member 25 may be doubled before replacement is required.

From the foregoing it will be noted that the clutch cannot engage after depression of the pedal until the trip roller 46 is tripped by a bevel corner of the clutching member. This insures a definite and proper relative position of the parts at the instant of positioning the member 25 for engagement. The accelerator spring 38 is sufficiently powerful to revolve the member 25 at a surface speed greater than that of the driving member 21, which further insures that 25 is completely and properly positioned as shown in Figure 5 before it can be engaged by 21. The trip and lock members, in combination with the clutching member itself, constitute an angular timing device by means of which the motions necessary for engagement automatically take place in accurate predetermined selective relation. Thus it is impossible for the device to mis-clutch and the destructive and dangerous results of improper or partial engagement are eliminated.

The clutch having been engaged as described, the clutching member 21 and the housing 26 with all attached parts revolve as a unit, transmitting the drive to any desired machine or element such as the shaft 107, Figure 6. As the roller 31 is carried around it engages the inclined shoe 90 as shown in broken lines in Figure 5. The shoe 90 is thereby depressed swinging the bell crank yoke 84 counter-clockwise and thereby withdrawing the latch nose 95 from the notch 56 in plunger 55. The release plunger 49 is thereby freed and is forced upward by the expansion of the spring 99 which raises the rod 98, rocks the lever 67 counter-clockwise, raises the block 64, and thus returns 49 to its upper position.

As the body or housing 26 nears the completion of its revolution the roller 31 again engages the contact block 51, and the continued motion of 26 swings the oscillator clockwise, compressing the spring 38, disengaging the member 25 from member 21 and allowing the yoke 39 to lock the parts in disengaged position. As disengagement is completed the contact block 51 by still restraining roller 31, stops all motion of the housing 26.

It will thus be seen that by the above described mechanism the driven parts of the clutch are automatically limited to a single revolution or single cycle operation for each engagement of the clutch. To cause re-engagement it is necessary for the operator to raise his foot, allowing the plunger 55 to engage the release plunger 49 by means of the latch 91, then depress the pedal 63 to cause an engagement and single driving revolution as described. The clutch thus is prevented from allowing accidental repeat strokes, for instance of a punch press, thereby eliminating danger of injury to operators or damage to machines and material.

When it is desired to allow continuous revolution of the driven parts, as in the case of machine tools with full automatic operation, the lever 78 is moved until the detent 104 seats in the notch 103 as shown in Figure 7. The link 75 is drawn to the left, moving the swinging link 72 clockwise. The shoulder 74 on link 72 engages shoulder 71 on the lever 67, rocking the latter clockwise and drawing down the block 64.

If the plunger 55 is in raised position due to the operator having raised his foot on the pedal 63, the right hand end of lever 67 engages shoulders 55a on the plunger 55, causing 55 also to be drawn downward, carrying with it the release plunger 49 to allow the clutch to engage. If the pedal is depressed as the lever 78 is shifted, and the latch 91 is released, the plunger 55 will be down and the release plunger 49 in its upper position. In this case the lowering of block 64 allows the release plunger 49 to descend by gravity to allow clutch engagement.

When lever 78 is in full automatic position, as shown in Figure 7, the block 64 is held down by the engagement of shoulders 71 and 74 as described, and the plunger 55 is also held down by the end of lever 67. Release plunger 49 therefore remains in its lower position, and the clutch revolves in continuous engagement.

As the lever 78 is shifted to full automatic position, as described, the link 75 swings the lever 76 and latch lever 81 clockwise, pressing the latch 82 against the end of bell crank 84 and compressing the spring 83 as shown in Figure 7. At the first contact of the roller 31 with the inclined shoe 90 by which the latter is depressed to swing the bell crank yoke 84 to the right, the spring 83 forces the latch 82 upward on the left of 84, thus holding the latter to the right and preventing the shoe 90 from returning upward. Due to the strength of spring 83 and the inclined edge of latch 82, the upward latching motion of the latter swings the bell crank 84 farther to the right, thus holding the inclined shoe 90 entirely clear of the roller 31 in the latter's subsequent revolutions.

Thus in full automatic position the all exterior control devices are completely clear of the clutch which remains engaged continuously until the lever 78 is returned to the left or semi-automatic position, whereupon the parts assume the relation shown and described in connection with Figure 1.

While the clutch as just described is particularly suitable for use in the machine producing cold flow referred to in the copending application aforesaid, it will be understood that it has many other applications and may be used in any form of mechanism in which a clutch of this type can with advantage be employed. Although the invention has been disclosed in connection with the specific details of a preferred embodiment thereof, it must be understood that such details are not intended to be limitative of the invention except in so far as set forth in the accompanying claims.

What is claimed is:

1. In a rotary power clutch, a clutching member, a member adapted to be engaged thereby, and mechanical means rotatable with one of said members and adapted to completely position the same for engagement by the other while said other member is in continued rotation with respect to said first member, said means being operable by said first member at a predetermined point prior to the engagement of said members.

2. In a clutch, a rotating clutching member, a member adapted to be engaged thereby, and means controlled by said clutching member and adapted to move said last member into position for engagement by said first member at a speed greater than the speed of said first member.

3. In a clutch, in combination, a clutching member, a rotative member adapted to be clutched by said first member, and an oscillator geared to said rotative member and adapted to rotate said second member into position for engagement by said first member, said oscillator being controlled by said clutching member.

4. In a clutch, in combination, a driving shaft, a clutching member secured thereto, a body rotatably mounted on said shaft, a member supported in said body and adapted to be engaged by said clutching member to cause rotation of said body, means to position said second member for engagement by said first member, and means to actuate said first means in predetermined angular relation to the position of said first member.

5. In a clutch, in combination, a clutching member, a member adapted to be clutched thereby, means to present said second member for engagement by said first member in angularly timed relation to the position of said first member, means to disengage said second from said first member, and a lock operable by said first means to lock said second member out of engagement with said first member.

6. In a clutch, a clutching member, a member adapted to be auto-selectively engaged by said clutching member, timing mechanism adapted to cause angularly timed auto-selective engagement of said second member by said clutching member, actuating means for actuating said second member to present it for engagement by and retract it from engagement with said clutching member, locking means actuated by said timing mechanism adapted to automatically lock said actuating means upon the disengagement thereby of said second member, and an accelerator comprising a resilient member adapted to operate said actuating means so as to cause the actuation thereby of said second member at a greater velocity of travel than the velocity of travel of said clutching member.

7. In combination, a clutching member, a member adapted to be selectively clutched by said clutching member, timing mechanism adapted to cause angularly timed engagement of said second member by said clutching member, an actuating member adapted to actuate said second member to present it for engagement by and retract it from engagement with said clutching member, locking means actuated by said timing mechanism adapted to automatically lock said actuating member upon the disengagement thereby of said second member, and an external reciprocal releasing member adapted upon its projection to engage said actuating member, thereby causing disengagement of said clutched member from said clutching member, and adapted upon its retraction to release said actuating member for actuation of said second member.

8. In a clutch, a clutching member, a member adapted to be selectively engaged by said clutching member, timing mechanism operable by said clutching member adapted to cause angularly timed selective engagement of said second member by said clutching member, an actuating member adapted to position said second member for engagement by and retract it from engagement with said clutching member, locking means operable by said timing mechanism adapted to automatically lock said actuating member upon the disengagement thereby of said second member, and an accelerator comprising a resilient member adapted to operate said actuating member whereby said second member is positioned at a greater velocity of travel than the velocity of travel of said clutching member.

9. A clutch comprising a rotative housing embracing a revoluble clutching member, a geared rotative member adapted to be engaged by said revoluble clutching member, a segmentally geared oscillator adapted to actuate said geared rotative member, a resilient accelerator adapted to automatically actuate said segmentally geared oscillator, a timer adapted to be contactively actuated by said revoluble clutching member and provided with a locking plunger adapted to lock or release said resilient accelerator, a contact member on said segmentally geared oscillator, a reciprocal member adapted upon its projection to engagedly actuate said contact member, thereby causing simultaneous withdrawal of said clutched member from engagement with said clutching member, and compressively storing and locking said resilient accelerator, manual means to retract said reciprocal member, means controllable by said contact member to project said reciprocal member after engagement of the clutch whereby said clutch may be stopped after a single revolution, and means to lock said reciprocal member in retracted position.

10. A clutching mechanism comprising a rotative housing embracing a revoluble clutching member, a rotative member adapted to be engaged by said clutching member, a segmentally geared oscillator adapted to actuate said rotative member, a resilient accelerator adapted to actuate said segmentally geared oscillator, a timer having a spring pressed locking plunger adapted to lock or to release said resilient accelerator and adapted to be contactively actuated by said revoluble cluching member, a contact roll on said segmentally geared oscillator, external to said clutch a release plunger adapted upon projection to contactively actuate said contact roll thereby actuating said segmentally geared oscillator to simultaneously release said rotative clutched member from said revoluble clutching member and store said resilient accelerator, means to position said plunger for engagement with said release roll or for release therefrom, resilient means including a counterpoise adapted to automatically return said release plunger to its projected position whereby said clutch may be disengaged after a single revolution, and means to lock said plunger in retracted position.

11. A clutching mechanism comprising a rotative housing embracing a revoluble clutching member, a rotative member adapted to be engaged by said clutching member, a segmentally geared oscillator adapted to actuate said rotative member, a resilient accelerator adapted by its stored energy to actuate said segmentally geared oscillator, a timer having a spring pressed locking plunger adapted to lock or to release said resilient accelerator and adapted to be contactively actuated by said revoluble clutching member, a contact roll on said segmentally geared oscillator, external to said clutch a reciprocable release plunger adapted to engage said contact roll whereby said segmentally geared oscillator may be moved to simultaneously release said rotative clutched member from said revoluble clutching member and store said resilient accelerator, means to position said release plunger for engagement with said release roll or for release therefrom, a resilient return device adapted to automatically return said release plunger to its position for engaging said contact roll, a counterpoise on said return device, means to lock said plunger in released position, a trip device operable by said release roll to release said locking means whereby said clutching member and said second member may be disengaged at the end of one revolution of said housing, and means to disable said trip device and said resilient return device.

12. In a rotary power clutch, in combination, a clutching member, a member adapted to be engaged thereby, mechanical means rotatable with one of said members and adapted to completely position the same while said other member is in continued rotation with respect to said first member, said means being operable by said first member at a predetermined point prior to the engagement of said members, an exterior positive stop presentable to engage said mechanical means to release the same whereby said members may be disengaged, and means controllable by said mechanical means to present said positive stop.

CHARLES H. HOWLAND-SHEARMAN.